United States Patent
Habetha

(10) Patent No.: US 7,031,321 B2
(45) Date of Patent: Apr. 18, 2006

(54) DYNAMIC NETWORK AND ROUTING METHOD FOR A DYNAMIC NETWORK

(75) Inventor: Joerg Habetha, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 119 days.

(21) Appl. No.: 10/480,076

(22) PCT Filed: Jun. 10, 2002

(86) PCT No.: PCT/IB02/02182

§ 371 (c)(1),
(2), (4) Date: Dec. 8, 2003

(87) PCT Pub. No.: WO02/102000

PCT Pub. Date: Dec. 19, 2002

(65) Prior Publication Data

US 2004/0170151 A1    Sep. 2, 2004

(30) Foreign Application Priority Data

Jun. 11, 2001  (DE)  ................................ 101 27 880

(51) Int. Cl.
*H04L 12/28* (2006.01)

(52) U.S. Cl. ................. 370/395.31; 370/252; 370/254; 370/351

(58) Field of Classification Search ............ 455/7, 455/11.1, 422.1; 370/218, 230, 252, 254, 370/285, 328, 338, 349, 351, 255, 389, 395.31, 370/401

See application file for complete search history.

(56) References Cited

U.S. PATENT DOCUMENTS

| | | | | | |
|---|---|---|---|---|---|
| 5,412,654 | A | * | 5/1995 | Perkins | 370/312 |
| 5,652,751 | A | * | 7/1997 | Sharony | 370/227 |
| 6,130,881 | A | * | 10/2000 | Stiller et al. | 370/238 |
| 6,304,556 | B1 | * | 10/2001 | Haas | 370/254 |
| 6,307,843 | B1 | * | 10/2001 | Okanoue | 370/312 |
| 6,418,476 | B1 | * | 7/2002 | Luciani | 709/238 |
| 6,535,498 | B1 | * | 3/2003 | Larsson et al. | 370/338 |
| 6,775,258 | B1 | * | 8/2004 | van Valkenburg et al. | 370/338 |
| 6,785,277 | B1 | * | 8/2004 | Sundling et al. | 370/392 |
| 2002/0009088 | A1 | * | 1/2002 | Donaghey et al. | 370/397 |
| 2002/0145978 | A1 | * | 10/2002 | Batsell et al. | 370/238 |
| 2002/0186665 | A1 | * | 12/2002 | Chaffee et al. | 370/255 |

OTHER PUBLICATIONS

Bellur et al.: "Topology Broadcast Based on Reverse-Path Forwarding" [Online], Mar. 2, 2001, Internet site: http://www.ietf.org/proceedings/01aug/I-D/draft-ietf-manet-tbrpf-01.txt.*

C.E. Perkins, Ad Hoc Networking, Addison Wesley, pp. 53-62.

* cited by examiner

*Primary Examiner*—William Trost
*Assistant Examiner*—James D. Ewart
(74) *Attorney, Agent, or Firm*—Larry Liberchuk

(57) ABSTRACT

The invention relates to a dynamic network with a plurality of nodes, in which it is provided that—routing information is stored in local routing tables in nodes of the network,—the nodes send an update request to other nodes for updating the local routing tables, and—the addressed nodes send an update response with updated routing information to the requesting nodes.

20 Claims, 4 Drawing Sheets

Figure 1:
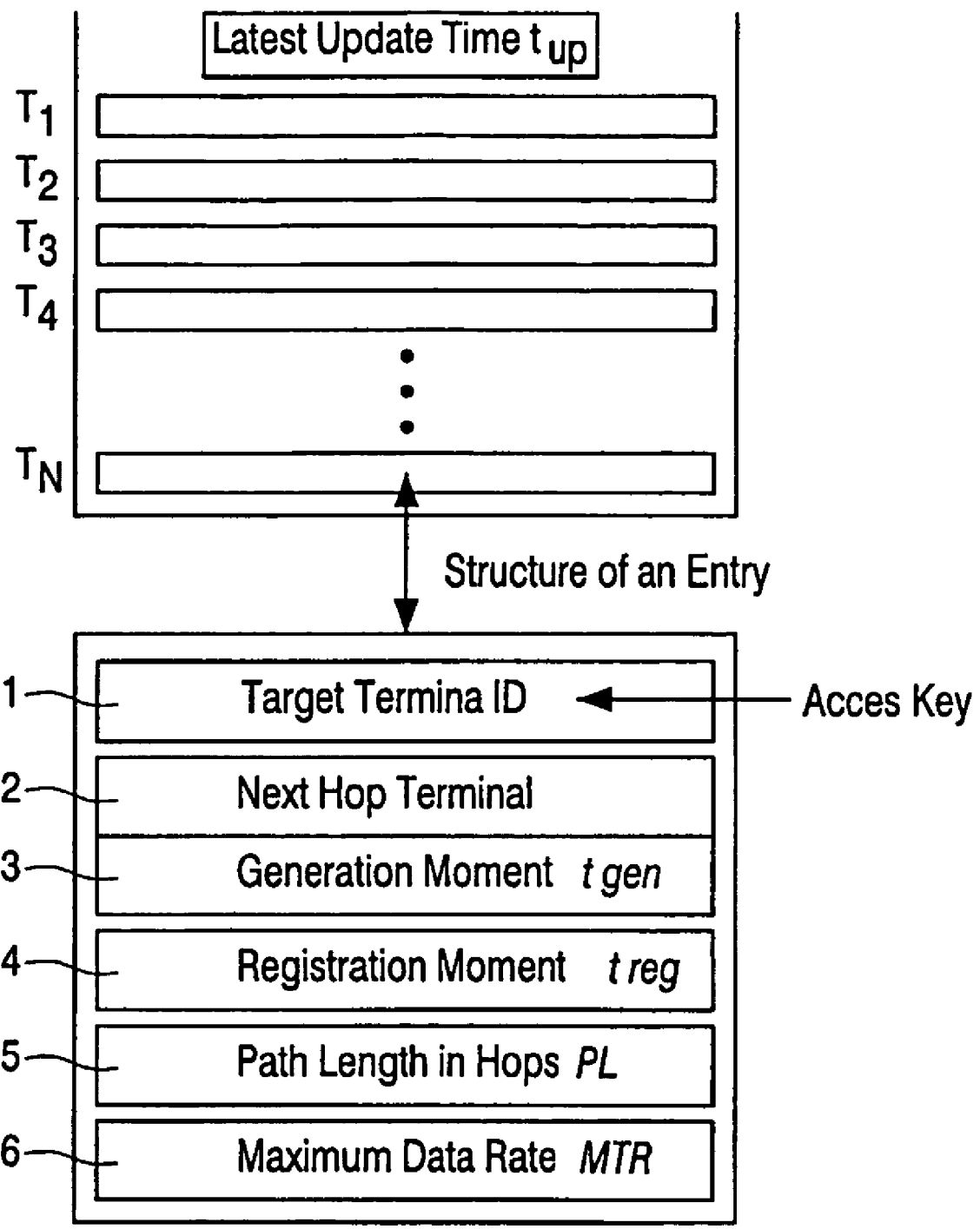

|  | CC1 | CC2 | CC3 | CC4 | CC5 |
|---|---|---|---|---|---|
| $t_0$ | F1<br>3<br>5Mbit/s<br>0<br>0 | -<br>1<br>5Mbit/s<br>0<br>0 | F2<br>3<br>5Mbit/s<br>0<br>0 | F3<br>3<br>0,1Mbit/s<br>0<br>0 | F4<br>5<br>1Mbit/s<br>0<br>0 |
| $t_1$ | -<br>1<br>10Mbit/s<br>1<br>1 | -<br>-<br>-<br>-<br>- | F2<br>3<br>5Mbit/s<br>0<br>0 | F3<br>3<br>0.1Mbit/s<br>0<br>0 | F4<br>5<br>1Mbit/s<br>0<br>0 |
| $t_2$ | -<br>1<br>10Mbit/s<br>1<br>1 | F1<br>3<br>10Mbit/s<br>1<br>2 | F2<br>3<br>5Mbit/s<br>0<br>0 | F3<br>3<br>0.1Mbit/s<br>0<br>0 | F4<br>5<br>1Mbit/s<br>0<br>0 |
| $t_3$ | -<br>1<br>10Mbit/s<br>1<br>1 | F1<br>3<br>10Mbit/s<br>1<br>2 | F2<br>5<br>5Mbit/s<br>1<br>3 | F3<br>5<br>0.1Mbit/s<br>1<br>3 | F4<br>5<br>1Mbit/s<br>0<br>0 |
| $t_4$ | -<br>1<br>10Mbit/s<br>1<br>1 | F1<br>3<br>10Mbit/s<br>1<br>2 | F2<br>5<br>5Mbit/s<br>1<br>3 | F3<br>5<br>0.1Mbit/s<br>1<br>3 | F4<br>7<br>1Mbit/s<br>1<br>4 |

Fig.4

DYNAMIC NETWORK AND ROUTING METHOD FOR A DYNAMIC NETWORK

The invention relates to a dynamic network and to a routing method for a dynamic network.

A dynamic network is understood to be a network whose topology can change dynamically during operation. This includes in particular ad hoc networks. An ad hoc network is understood to be a self-organizing network in which the structure and the number of participants is not laid down within given limit values. For example, a communication device of a participant may be taken from the network or included in the network. In contrast to traditional mobile telephone networks, an ad hoc network is not based on a fixedly installed infrastructure.

Dynamic networks, however, may alternatively be, for example, Internet networks whose topology changes during operation.

Such an ad hoc network is known from the book: C. E. Perkins, Ad Hoc Networking, Addison Wesley, pp. 53–62. Each node in this known network sends updates of the routing information to adjoining nodes at regular intervals so as to adapt the routing to changes in the network topology.

It is an object of the invention to provide a network of the kind mentioned in the opening paragraph which renders possible an improved routing in the case of changes in the network topology. It is a further object of the invention to indicate a relevant routing method.

As regards the network, the object is achieved by means of a dynamic network with a plurality of nodes, in which it is provided that routing information is stored in local routing tables in nodes of the network, the nodes send an update request to other nodes for updating the local routing tables, and the addressed nodes send an update response with updated routing information to the requesting nodes.

In the network according to the invention, routing information is stored in nodes of the network. Routing information is preferably stored in every node in the case of decentralized networks. Routing information is preferably stored in the central nodes only in the case of cluster networks with central controllers.

The routing information is stored in the form of routing tables. The routing table of a node preferably comprises fields for all other nodes of the network or for those nodes which are accessible from the node in question. The nodes accessible from a given node, i.e. to which a transmission is possible or desired, are denoted target nodes.

The routing information stored in the fields, for example of the next node via which a data transmission to the respective target node is to take place (next hop), may be the path length to the target node and the maximum transmission capacity to the target node.

To keep the local routing tables up to date, the nodes having a routing table preferably send an update request to other nodes at regular intervals. These other nodes are in particular adjoining nodes. They are in particular adjoining controllers in the case of cluster networks with central controllers.

The update request signals to the nodes receiving this request that they should send updated routing information to the requesting nodes.

The advantage of the requesting mechanism is in particular that the requesting mechanism renders possible a combined transmission of the routing information. The individual nodes transmit modified routing information upon request only. In the case of a request, several topology changes, i.e. the topology changes that have occurred in the time period between two requests, may then be sent jointly to the requesting nodes. In a single protocol data unit (PDU), accordingly, several changes in the network topology can be sent to the requesting nodes. This leads to a reduction in the number of PDUs (packets) which are to be transmitted for the routing purposes.

The invention is based on the idea that the quantity of data to be transmitted for updating the local routing tables can be reduced in that the individual nodes request routing information from other nodes.

The advantageous embodiment of the invention as defined in claim 2 is based on the idea that it is notified to the addressed nodes how up to date the routing information of the requesting nodes is. This renders it possible for the addressed nodes to make a selection of routing information which is to be sent to the requesting node. Only those routing data are transmitted to the requesting node each time which are more recent than the routing information of the requesting node up to that moment.

For this purpose, the local routing tables contain a table update information and a field update information. The table update information contains data on how up to date the local routing table is, i.e. when the latest change in the routing table was applied. This may be, for example, a time indicator or a sequence number. The field update information contains data on how up to date the individual fields of the routing table are, i.e. when the latest change was applied in the respective field of the routing table. The field update information may again be, for example, a time indicator or a sequence number. The table update information thus corresponds to the most recent field update information of the respective routing table.

The update request contains the table update information of the requesting node. This allows the addressed node to make a selection of the routing information to be sent to the requesting node. The addressed nodes know from the table update information of the requesting node how up to date the routing table of the requesting node is, i.e. when the most recent change was made in the routing table of the requesting node. The addressed nodes send an update response containing only that local routing information which is more recent than the table update information to the requesting node. If the table update information is a time indicator, only those routing data are transmitted which are more recent in time. The selection of the routing information may take place through comparison of the table update information of the requesting node with the individual field update information of the fields of the routing tables of the addressed nodes. Such a selection of the transmitted routing information reduces the data quantity to be transmitted for the routing between the individual nodes. Efficient routing methods can be implemented in this manner.

The transmission of the table update information to the addressed nodes has the advantage that the table update information requires only little transmission capacity and that only one item of table update information is to be transmitted for each routing table or node. The update request thus occupies only little transmission capacity. This is advantageous in particular in the case of wireless networks.

In the advantageous embodiment of the invention as defined in claim 3, the local routing tables contain a topology change information. The up-to-dateness of a change in the network topology can be characterized by the topology change information, so that it can be indicated when a change in the network topology has occurred in the network. Preferably, each field in the local routing tables contains an item of topology change information. This may be, for example, a time indicator or a sequence number. Since it takes some time until the information relating to a change in the network topology has been distributed over the individual nodes of the network, it can be distinguished in each node receiving this information later in time whether this information is new to it, whether it has stored this information already, or whether this information is already obsolete for it, for example because it has already received a more recent item of information from a different node. The topology change information thus renders it possible to carry out efficient updates of the local routing tables.

This is achieved in the advantageous embodiment of the invention as defined in claim 4 in that the update response comprises the topology change information, and that an update of the individual fields of the local routing tables is carried out if the topology change information of the addressed node is more recent than the topology change information of the requesting node. The node which has sent an update request to adjoining nodes may thus carry out a selective update after receiving the replies. An update of the individual fields of the requesting node is carried out if a more up to date or more recent information on the network topology is obtained thereby.

If the topology change information of the addressed node is as recent as the topology change information of the requesting node, according to the advantageous embodiment of the invention as defined in claim 7, an update will be carried out if the path length to the respective target node is made shorter by the update.

In the advantageous embodiment of the invention as defined in claim 8, an update is carried out if the topology change information of the addressed node is as recent as the topology change information of the requesting node, and the maximum data transmission rate to the respective target node is made-greater by the update.

The advantageous embodiments of the invention as defined in claims 7 and 8 may also be combined, in which case the criterion of claim 7 or the criterion of claim 8 may be given a higher priority, depending on the application.

The embodiment of claim 5 has the advantage that time information renders possible an independent comparison of the up-to-dateness of the individual items of routing information.

The embodiment having sequence numbers as defined in claim 6 can be realized in a particularly simple manner.

It is advantageous in the case of central cluster networks which have a central node (controller) for controlling the clusters (sub-networks) to store the routing table for the respective sub-network centrally in the central node. The transmission of information between the individual sub-networks takes place via bridge nodes or forwarders.

The object of the invention relating to the method is achieved by means of a method having the characteristics of claim 10.

Figure 2:
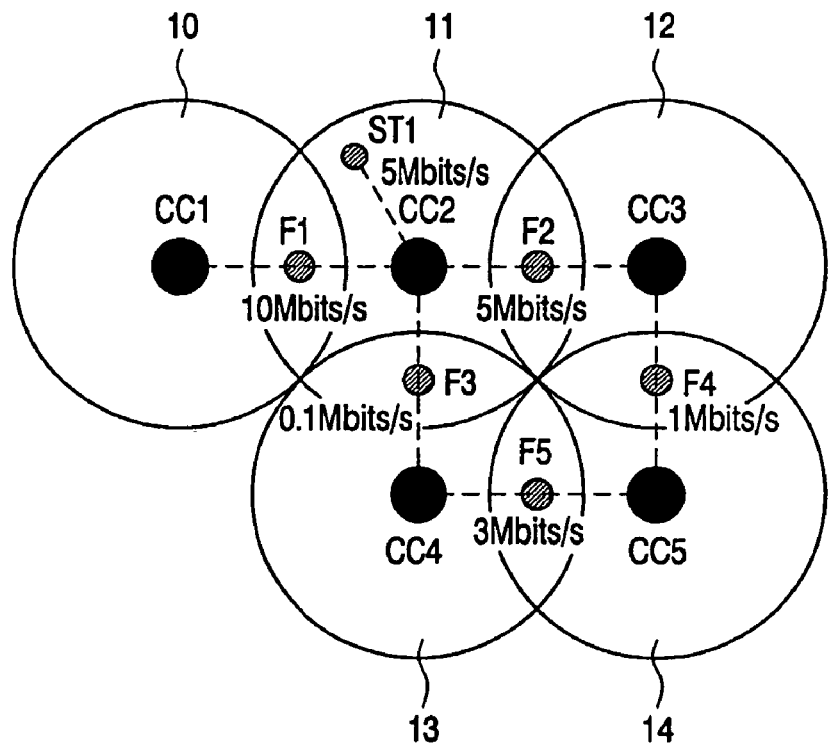
Figure 3:
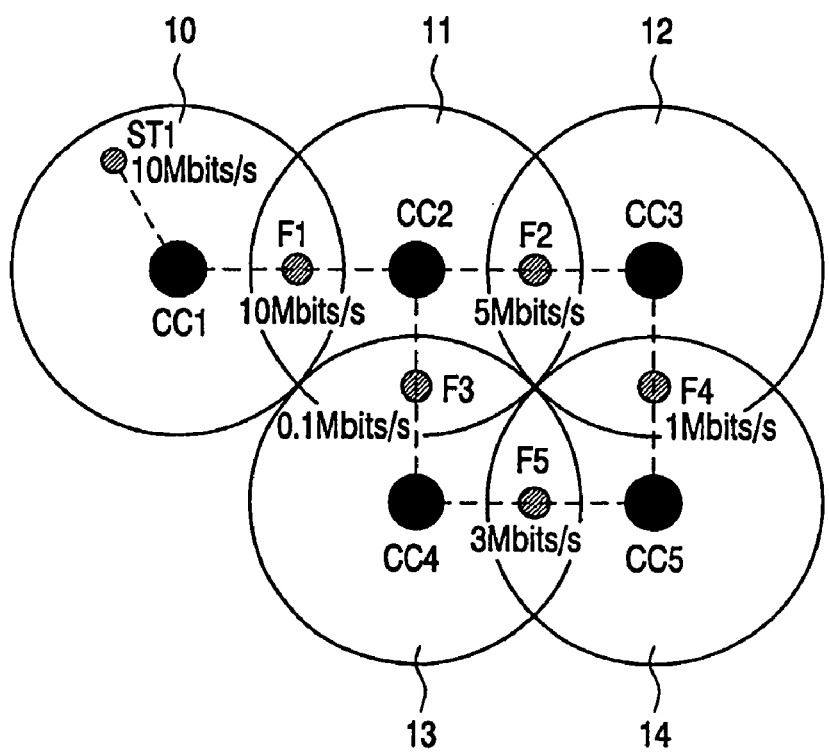
Figure 5:
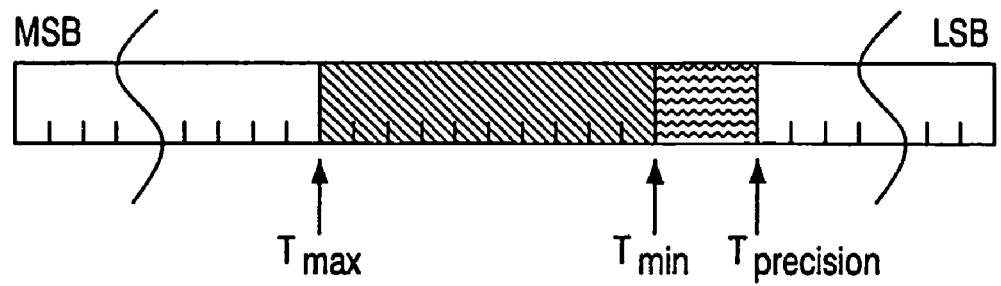
Figure 6:
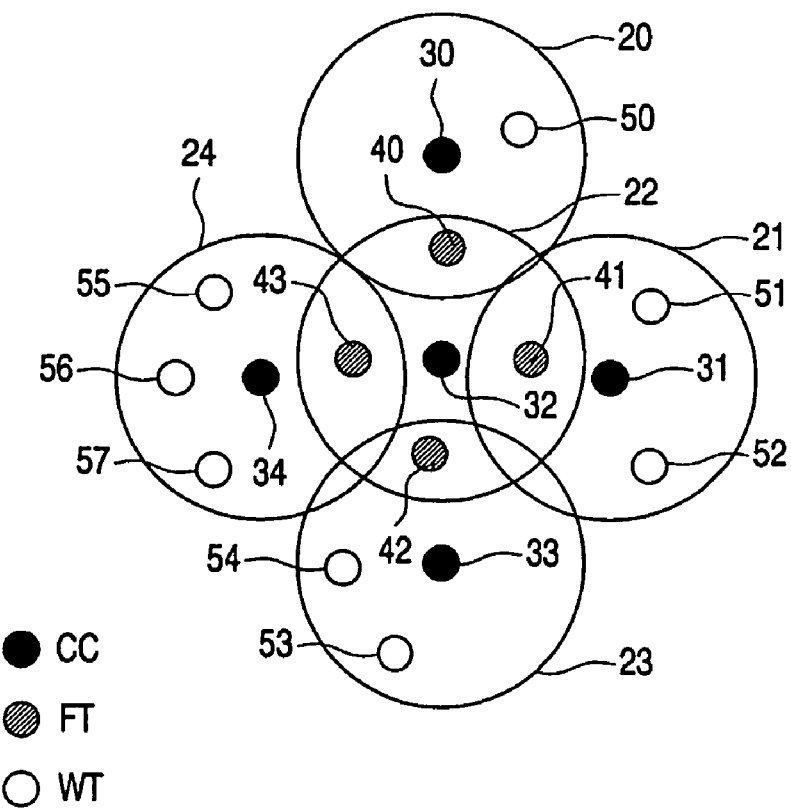

A few embodiments of the invention will now be explained in more detail below with reference to the drawing comprising FIGS. 1 to 6, in which:

FIG. 1 shows a routing table with routing information,

FIG. 2 shows a dynamic network with 5 sub-networks, each controlled by a central controller, at a first moment in time, FIG. 3 shows the network of FIG. 2 at a second moment in time, with a node of the network shifted to an adjoining sub-network as compared with FIG. 2, FIG. 4 is a table showing the time sequence of the change of the routing tables of the central controller as a result of the shift of the network node, FIG. 5 shows part of a time register, and FIG. 6 shows a network with 5 sub-networks which are each controlled by a central controller.

FIG. 1 shows a routing table which is stored in the routing node or station of a network. The routing table comprises fields T1 to TN for each station of the overall network as well as a time $t_{up}$ as a table update information, i.e. the time at which the routing table was changed for the last time. The fields T1 to TN of each individual station of the network comprise 6 sub-fields 1 to 6. The first sub-field 1 contains the identification number (ID) of the respective target station. The second sub-field 2 stores the ID of that station to which the data destined for the target station of the first sub-field 1 are to be passed on. It is thus always stored for each possible target station which is the so-called "next hop" on the way to this target station. If the target station itself is the next hop, the target station itself is entered in the second sub-field 2. The third sub-field 3 stores the generation time $t_{gen}$ of the field as a topology change information. The generation time $t_{gen}$ indicates when a change has occurred in the network topology for this field, i.e. for this target station. It is laid down by that station which detects the change in the network topology and subsequently implements a change in the contents of the field in its local routing table. The fourth sub-field 4 contains a time $t_{reg}$. This indicates when a change in the contents of a field was adopted by the respective station in the routing table owing to a change in the network topology, or when the changes notified by adjoining stations were adopted. The fifth sub-field 5 of each field contains a quantity such as, for example, the remaining path length up to the target station. Further quantities may be stored in additional sub-fields of each field. The sixth sub-field contains the maximum data rate with which data can be transmitted to the target station. This data rate corresponds to the minimum data rate of all constituent paths from the relevant station to the target station.

An UPDATE procedure is provided for refreshing the routing tables so as to keep the routing tables up to date at all times. This UPDATE procedure is based on a request-response mechanism. Each routing station periodically initiates this UPDATE procedure. The station, referred to below as the UPDATING station (US), transmits an UPDATE REQUEST message in the broadcast mode to its immediate (routing) neighbor stations. The UPDATE REQUEST message contains the time $t_{up}$, i.e. the moment of the most recent table update of the requesting station.

Upon reception of the UPDATE REQUEST, the neighboring stations compare the received time $t_{up}$ with the registration times $t_{reg}$ of each individual entry in their own routing tables. When this comparison has been completed, each neighboring station sends an UPDATE RESPONSE message (possibly segmented) to the requesting station US, in which message all those entries of the respective routing table are included which were entered into the table after the moment $t_{up}$, i.e. for which it is true that $t_{reg} > t_{up}$. It should be noted that the time $t_{up}$ should generally be converted to the clock system of the respective neighboring station before the times $t_{reg}$ and $t_{up}$ can be compared. This circumstance and the steps made necessary thereby will be clarified after the description of the general routing procedure. All fields are transmitted for each of the entries to be transmitted, except for the next hop terminal ID and the registration time $t_{reg}$, because these are irrelevant for the requesting station US.

Upon reception of the UPDATE RESPONSE, the US compares the generation times and quantities of the entries received with the generation times and quantities of the entries present at that moment in its own routing table.

The newly received entries or fields are now denoted "new", and the entries of the requesting station obtaining until that moment are denoted "US". "PL" denotes the path length, as is apparent in FIG. 1, and "MTR" the maximum transmission rate. $MTR^{US-NS}$ denotes the maximum transmission rate between the requesting and the replying neighboring station. By analogy, $PL^{US-NS}$ denotes the number of hops between the requesting station US and the neighboring station NS. This is because it is conceivable that not all stations provide routing data. It could thus happen that two routing stations, which are neighbors in the sense of the routing procedure, communicate with one another via one or several non-routing stations.

According to the invention, the US only carries out those entries which fulfill the following criteria:

$$t_{gen}^{new} > t_{gen}^{US}$$
$$\text{or } (t_{gen}^{new} = t_{gen}^{US} \text{ and } PL^{new} + PL^{US-NS} < PL^{US})$$
$$\text{or } (t_{gen}^{new} = t_{gen}^{US} \text{ and } PL^{new} + PL^{US-NS} =$$
$$PL^{US} \text{ and } \min(MTR^{new}, MTR^{US-NS}) > MTR^{US})$$

Once the UPDATE criteria for a received entry have been fulfilled, a few fields of the contents until that moment are replaced as follows:
the next hop terminal ID is replaced with the ID of the relevant neighboring station.
the generation time of the new entry is adopted:

$$t_{gen}^{US} = t_{gen}^{new}$$

the new path length is: $PL^{US} = PL^{new} + PL^{US-NS}$
the new maximum data rate is: $MTR^{US} = \min(MTR^{new}, MTR^{US-NS})$ In this case, too, the station must convert the time $$t_{gen}^{new}$$

into its own time system before time comparisons and replacements can be carried out (see the explanation further below).

FIG. 2 shows a network with 5 sub-networks 10 to 14 at a first moment t0. The sub-networks 10 to 14 are each controlled by a respective central controller CC1 to CC5. The individual sub-networks 10 to 14 can each be connected via bridge nodes or forwarders F1 to F5. The bridge node F1 connects the sub-networks 10 and 11, the bridge node F2 the sub-networks 11 and 12, the bridge node F3 the sub-networks 11 and 13, the bridge node F4 the sub-networks 12 and 14, and the bridge node F5 the sub-networks 13 and 14. By way of example, a station ST1 is present in the sub-network 11. The sub-networks 10 to 14 may comprise further stations or nodes (not shown) in any manner whatsoever. In addition, FIG. 2 shows the transmission rates of the links between the individual sub-networks as well as between the CC2 and the station ST1. The transmission rate between the sub-network 10 and the sub-network 11 via the forwarder F1 is 10 Mbit/s, the transmission rate between the sub-network 11 and the sub-network 12 via the forwarder F2 is 5 Mbit/s, the transmission rate between the sub-network 11 and the sub-network 13 via the forwarder F3 is 0.1 Mbit/s, the transmission rate between the sub-network 12 and the sub-network 14 via the forwarder F4 is 1 Mbit/s, and the transmission rate between the sub-network 13 and the sub-network 14 via the forwarder F5 is 3 Mbit/s. Finally, the transmission rate between the controller CC2 and the station ST1 is 5 Mbit/s. The links in the network shown by way of example in FIG. 2 thus always pass through the central controllers CC1 to CC5.

FIG. 3 shows the network with 5 sub-networks of FIG. 1 at a second moment t1. The topology of the network has changed at this second moment, i.e. the station ST1 has moved from the sub-network 11 to the neighboring sub-network 10. The transmission rate between the controller CC1 of the sub-network 10 and the station ST1 now is 10 Mbits/s.

FIG. 4 illustrates the changes in the routing tables of the controllers CC1 to CC5 over time as a result of the shift of the station ST1 from the sub-network 11 of FIG. 2 to the sub-network 10 as shown in FIG. 3.

The Table of FIG. 4 contains a column for each of the controllers CC1 to CC5. The fields of the routing tables of the individual controllers for the target station ST are indicated in the columns at five different moments t0 to t4 for the controllers CC1 to CC5. The fields in this example each have 5 sub-fields. The sub-field provided in accordance with FIG. 1 containing the identification number (ID) of the respective target station is not shown in FIG. 4, because FIG. 4 shows routing information relating to the target station ST1 only.

The upper sub-field of the fields in FIG. 4 indicates the bridge node or forwarder to which the data destined for the station ST1 are to be passed on. This means that only the so-called next hop on the way to this target station ST1 is stored each time for this target station ST1. The second sub-field 5 from the top contains the remaining path length up to the target station. The central sub-field contains the maximum data rate with which data can be transmitted to the target station ST1. This data rate corresponds to the minimum data rate of all constituent paths from the relevant controller up to the target station ST1. The second sub-field from the bottom provides the generation time $t_{gen}$ of the field for the target station ST1 by way of topology change information. The generation time $t_{gen}$ indicates when a change has occurred in the network topology for the target station ST1. It is registered by that station which detects the change in the network topology and subsequently carries out a change in the contents of the field in the local routing table. In the present case this is the controller CC1 of the sub-network 10. The bottom sub-field contains the time $t_{reg}$. This indicates when the change in the network topology was included into the respective routing table by the respective station, i.e. in this example by the respective controllers, or when the changes transmitted by neighboring stations were adopted.

In the present example, the column contains the fields of the routing tables of the controllers CC1 to CC5 for the target station ST1 and the network in accordance with FIG. 2 at the moment t0.

At the moment t1, the target station ST1 is shifted from the sub-network 11 to the sub-network 10. This corresponds to the network topology of FIG. 3. This is recognized by the controller CC1 of the sub-network 10, and this controller CC1 accordingly changes its routing table at the moment t1. The topology change information has accordingly arisen at the moment t1, which means that $t_{gen}=1$ is set. The change that has occurred in the network topology was also entered by the controller CC1 in its routing table at the moment t1 and registered accordingly. This means that $t_{reg}$ is also set for 1. The controllers CC2 to CC5 do not know the change in the network topology at the moment t1 yet. This information must first be distributed over the network. This is done by means of the requests sent by the individual controllers to the neighboring controllers at regular intervals, and by means of the relevant responses of the controllers thus addressed.

The controller CC2 receives a reply to its request from the controller CC1 at the moment t2, and the change in the network topology is entered into the routing table of CC2. Since the topology change has occurred at the moment t1, $t_{gen}=1$ is set. The change in the network topology was entered by the controller CC2 into its routing table at the moment t2 and registered accordingly. This means that $t_{reg}$ is set for 2.

The controllers CC3 and CC4 receive a reply to their requests from the controller CC2 at the moment t3, and the change in the network topology is entered into the routing tables of CC3 and CC4. Since the topology change has occurred at the moment t1, $t_{gen}=1$ is set. The change in the network topology was entered into the routing tables by the controllers CC3 and CC4 at the moment t3 and registered accordingly. This means that $t_{reg}$ is set for 3.

The controller CC5 receives a reply to its request from the controller CC3 and/or the controller CC4 at moment t4, and the change in the network topology is entered into the routing table of CC5. Since the topology change has occurred at the moment t1, $t_{gen}=1$ is set. The change in network topology was entered into the routing table of the respective controller CC5 at the moment t4 and registered accordingly. This means that $t_{reg}$ is set for 4.

The further sub-fields are also adapted to the changed network topology at the respective moments t1 to t4 in a corresponding manner.

Additional functions may be implemented in the routing, if so desired. The constant period of refreshing of the routing tables means that topology changes occurring between two UPDATE moments are not communicated immediately to the neighboring stations, but at the next UPDATE moment. Advantageously, however, particularly important changes, such as the failure of connection paths, may also be communicated to the neighbors without any preceding request. This is done by means of an UPDATE TRIGGER message which contains the relevant entries relating to the changed fields.

To avoid data on current links being lost in the time between the topology change and the next UPDATE moment, moreover, the node detecting the topology change may send an ERROR message to the sources or end terminals of the relevant links in order to stop the current connection.

The moments in time $t_{up}$, $t_{gen}$, and $t_{reg}$ defined in the protocol may be coded in various ways. An obvious coding relates to an overall system clock which is coded as a multiple of a basic clock modulo a maximum value in the form of a bit sequence. The use of an overall system clock, however, would require a synchronization of all stations of the network. Some communication standards (for example the standard 1394.1) already achieve a synchronization of all appliances of a network, but the availability of an overall system clock cannot be taken for granted in general. For this reason, the use of an overall system clock is avoided. The algorithm is in fact already fully functional if neighboring stations are informed about the difference between their local times or clocks. It is accordingly provided that neighboring stations inform one another of their prevailing local system clocks. The period of this information exchange may usually be chosen to be extremely wide, as will be explained further below. The clock information exchange thus represents a negligibly small occupation of transmission resources. Each station stores the difference between its local time and the local time of each individual neighboring station. When a station receives an UPDATE request with the parameter $t_{up}$, it will add the clock difference stored in relation to the relevant neighboring station to $t_{up}$ so as to convert the moment of the most recent change in the routing table of the neighboring station into its own time system. Then the converted time $t_{up}$ may be compared with the registration times $t_{reg}$ of the own routing inputs in accordance with the normal routing procedure, and an UPDATE response can be generated. When a station receives an UPDATE response to a preceding UPDATE request, the generation time $t_{gen}$ of each entry received is first converted into the local time system exactly as in the preceding case in that the clock difference with the relevant neighboring station is added to the time $t_{gen}$. Then it is decided in accordance with the normal run of the routing algorithm whether the received entry is to be included into the own routing table or not.

It should be noted that the clock difference stored by two neighboring stations has opposed signs, i.e. in the case of an exchange of an UPDATE request and UPDATE response between two neighboring stations the addition of a positive clock difference value in one station will correspond to the subtraction of the same positive value (i.e. the addition of a negative value) in the other station.

Clock generators usual at present generally have an accuracy in the microsecond or nanosecond range. Such a high accuracy of the time definition is not necessary for the routing procedure under discussion here. To minimize the number of bits to be transmitted, accordingly, no more than a fraction of the internal clocks of the stations is used for the time indicators $t_{up}$, $t_{gen}$, and $t_{reg}$.

FIG. 5 shows by way of example an excerpt from a complete time register. The intervals of the register shown in FIG. 5 correspond to single bits. The time value is dually coded, the significance of the bits increasing from right to left, so that the Most Significant Bit (MSB) lies at the extreme left.

The excerpt of the register chosen for the routing procedure, shown hatched in FIG. 5, is determined by the two times $T_{max}$ and $T_{min}$.

The upper limit of the chosen register excerpt determines the maximum time after which an entry into a routing table must be erased. This is based on the modulo definition of the time excerpt within the routing procedure. A station must test each entry already present in the routing table at each time step ($T_{precision}$) as to whether the generation time $t_{gen}$ of the entry corresponds to the current local time (or the excerpt from the time register). If this is the case, the entry is erased. This is because an old entry would otherwise seem to be highly up to date again after one modulo period because of the modulo definition.

The order of magnitude of $T_{min}$ determines the accuracy of the time coding and bases itself on the minimum period of transmission of the UPDATE request messages. The reason for this is that all entries changed in the responding station since the latest UPDATE of the requesting station are sent to the requesting station, independently of whether the changes were implemented shortly or long after the latest UPDATE. The same holds for the replacement of entries in the requesting station. A more accurate coding of the time will give no advantage in this respect and will merely occupy transmission capacity.

Advantageously, however, an excerpt enlarged by a few bits in downward direction (up to the time $T_{precision}$ in FIG. 5) is chosen for transmitting and storing the times $t_{up}$, $t_{gen}$, and $t_{reg}$, although only the bits fully hatched in FIG. 5 are actually processed in the routing algorithm. Propagation effects of rounding errors in the conversion of the clocks of one timing system into another timing system can be avoided in this manner.

The register excerpt is laid down once and for all and cannot be changed during the operation of individual stations.

The same is not true, however, for the period of transmission of the UPDATE request messages. The routing method does not require all stations to use the same period. This is utilized in the sense that each station optimizes its own UPDATE period during operation. Empty UPDATE response messages may, for example, point to the fact that the UPDATE period can be expanded. High topology change rates and subsequent connection interruptions and packet losses should lead to a reduction of the UPDATE period. The routing method thus automatically adapts itself to various system scenarios and mobility rates.

In accordance with the coding instruction shown, the statement made initially may now be motivated, i.e. the statement that the information exchange for determining the clock differences between neighboring stations may take place comparatively seldom: the frequency of the information exchange follows the so-termed clock drift of the local clock generator of each station. Usually the clock drift is of the order of or even a few orders of magnitude lower than the minimum coding level of the clock register (least significant bit or LSB in FIG. 5). The lower limit of the excerpt considered, i.e. the time $T_{min}$, however, is chosen to be higher by a few powers of two as shown in FIG. 5. An exchange of information on the clock differences should then take place at the latest when a shift of the order of $T_{precision}$ could be achieved on account of the clock drift.

Subsequently, the exchange of information about the clock differences is represented for a self-organizing network organized in the form of sub-networks or clusters. An example of such a network is shown in FIG. 6.

In the cluster-based network of FIG. 6, a single station, the central controller (CC), carries out the routing algorithm for all stations of its own cluster. The network of FIG. 6 comprises five clusters 20 to 24. The clusters 20 to 24 have CCs 30 to 34. This means that only the CCs 30 to 34 are neighbors in the sense of the routing method described above. The CCs, however, cannot communicate directly with one another in general, but they must exchange information via so-termed forwarding terminals (FT) which lie in the overlapping regions of the clusters. The clusters 20 and 22 are connected by means of an FT 40, the clusters 21 and 22 by means of an FT 41, the clusters 22 and 23 by means of an FT 42, and the clusters 24 and 22 by means of an FT 43. The cluster 20 has, for example, a further station 50, the cluster 21 further stations 51 and 52, the cluster 23 further stations 53 and 54, and the cluster 24 further stations 55 to 57.

The time or clock information is exchanged between the CCs 20 to 24 in the following manner: each FT 40 to 43 and each CC 20 to 24 stores a copy of its complete clock register at the start of each MAC frame. Furthermore, each CC periodically (in accordance with the period of the clock information exchange) transmits a broadcast message within its cluster in which the copy of the clock register at the start moment of the present MAC frame is contained as a parameter. The FTs receiving this message form the difference from the copy of their own clock register and the received copy of the clock register of the CC. In this manner they determine the shift between the clocks of the CC and their own clocks and store this difference. Once an FT has determined the difference with a further CC by the same procedure, it is capable of determining the clock difference of the two CCs by subtracting the two shift values. The clock difference is subsequently transmitted to the two CCs in a signaling message specially designed for this purpose.

The invention claimed is:

1. A dynamic network, comprising:
a plurality of nodes for transmitting and receiving information, each of said nodes including local routing tables in which routing information is stored, each of said local routing tables including a first ield containing a time-based network topology change information and a second field containing a time-based indication of when said local routing table has changed as a result of the change in the network topology,
each of said nodes is arranged to send an update request to other, addressed ones of said nodes for updating the local routing tables in said node, the update request including time-based table update information indicative of the most recent update of said local routing tables in said requesting node, and
each of said addressed nodes is arranged to send at least one update response with updating routing information to the requesting one of said nodes only when said local routing tables of said addressed node reflect more updated routing information than said local routing tables of said requesting node as determined by analysis of said second field in said local routing tables of said addressed node and the table update information in the update request,
said requesting node being arranged to consider a change in said local routing table only when the at least one update response with updating routing information being sent by one of said addressed nodes indicates a later change in the network topology or an equally up-to-date network topology and a more desirable data transmission.

2. A network as claimed in claim 1, wherein said local routing tables contain the time-based table update information relating to the most recent updating of said local routing table and said second field in said local routing tables reflects field update information relating to the most recent updating of the individual fields, the update response containing those items of local routing information for which the field update information of said addressed node is more up to date than the table update information of said requesting node.

3. A network as claimed in claim 1, wherein said first field characterizes the up-to-dateness of a change in the network topology.

4. A network as claimed in claim 3, wherein said nodes are arranged such that the update response generated by addressed one of said nodes contains said first field of said local routing tables of said addressed node and characterizes the topology change information,
said requesting node being arranged to consider a change in said local routing table only when the at least one update response with updating routing information being sent by one of said addressed nodes indicates a later change in the network topology as determinable by analysis of said first field in said local routing table in said requesting node and said first field contained in the update response with updating routing information.

5. A network as claimed in claim 1, wherein the contents of said first and second fields are items of time information.

6. A network as claimed in claim 1, wherein the contents of said first and second fields are constituted by sequence numbers.

7. A network as claimed in claim 1, wherein said requesting node after receiving the update responses from one of said addressed nodes is arranged to carry out an update of its local routing table only when the at least one update response with updating routing information being sent by one of said addressed nodes indicates a network topology equally up to date as the topology change information of said requesting node and a path length to a respective target node is made shorter by the update.

8. A network as claimed in claim 1, wherein said requesting node after receiving the update responses from one of said addressed nodes is arranged to carry out an update of its local routing table only when the at least one update response with updating routing information being sent by one of said addressed nodes indicates a network topology equally up to date as the topology change information of said requesting node and a maximum data transmission rate to an envisaged target node is made higher by the update.

9. A network as claimed in claim 1, wherein the network is subdividable into several sub-networks which each contain a controller for controlling said sub-networks,
said sub-networks being interconnectable by means of respective forwarding terminals, and
each controller being designed for storing and managing a central routing table for a respective one of the sub-networks.

10. A network as claimed in claim 1, wherein each of said local routing tables include a third field containing table update information relating to the most recent update of said local routing table, a fourth field containing an identification of a target node, a fifth field containing an identification of an adjoining node in a path toward the target node, and a sixth field containing a quantity representing a path length to the target node.

11. A network as claimed in claim 10, wherein each of said local routing tables further includes a seventh field containing a maximum data rate at which data is transmittable to the target node.

12. A network as claimed in claim 1, wherein the time-based table update information and the contents of said first and second fields are coded.

13. A network as claimed in claim 1, wherein each of said nodes when acting as an addressed node is arranged to convert the time-based table update information contained in the update request into its own time system before comparing the time-based table update information to said second field in said local routing tables of said addressed node.

14. A network as claimed in claim 1, wherein each of said nodes when acting as a requesting node is arranged to convert the time-based information in said first field contained in the at least one update response with updating routing information into its own time system before comparing said second field of said local routing tables of said addressed node with said second field of said local routing tables of said requesting node.

15. A network as claimed in claim 1, wherein each of said nodes is arranged to generate and send the at least one update response by combining information about a plurality of network topology changes in a single update response.

16. A routing method for a dynamic network having a plurality of nodes, comprising:
storing routing information in local routing tables in each node of the network, each of the local routing tables including a first field containing a time-based network topology change information and a second field containing a time-based indication of when the local routing table has changed as a result of the change in the network topology,
sending an update request from each of the nodes to other, addressed one of the nodes for updating the local routing tables in that node, the update request including time-based table update information indicative of the most recent update of the local routing tables in the requesting node,
sending at least one update response with updating routing information from each of the addressed nodes only when the local routing tables of the addressed node reflect more updated routing information than the local routing tables of the requesting node as determined by analysis of the second field in the local routing tables of the addressed node and the table update information in the update request, and
changing the local routing tables in the requesting one of the nodes only when the at least one update response with updating routing information being sent by one of the addressed nodes indicates a later change in the network topology or an equally up-to-date network topology and a more desirable data transmission.

17. A method as claimed in claim 16, wherein the local routing tables in the requesting one of the nodes are changed only when the at least one update response with updating routing information being sent by one of the addressed nodes indicates a later change in the network topology.

18. A method as claimed in claim 16, wherein the local routing tables in the requesting one of the nodes are changed only when the at least one update response with updating routing information being sent by one of the addressed nodes indicates an equally up-to-date network topology and a path length to a respective target node is made shorter by the update or a maximum data transmission rate to an envisaged target node is made higher by the update.

19. A node for a dynamic network, comprising:
local routing tables in which routing information is stored, each of said local routing tables including a first field containing a time-based network topology change information and a second field containing a time-based indication of when the local routing table has changed as a result of the change in the network topology,
the node being arranged to generate and send an update request to other nodes which respond to the update request by sending at least one update response with updated routing information, the update request including time-based table update information indicative of the most recent update of said local routing tables in the requesting node,
the node being arranged to consider a change in said local routing table only when the updating routing information of the at least one update response sent by the other nodes indicates a later change in the network topology or an equally up-to-date network topology and a more desirable data transmission.

20. A node as claimed in claim 19, wherein the node is arranged to receive update requests from other nodes and send at least one update response with updating routing information in response to the update request to the requesting node only when the contents of said second field of said local routing tables of said node indicates that said local routing tables of said node reflect more updated routing information than said local routing tables of the requesting node as determined by analysis of said second field in said local routing tables of the node and said second field of said local routing tables of the requesting node as sent in the update request.

* * * * *